United States Patent [19]

Masuda et al.

[11] 3,731,007

[45] May 1, 1973

[54] MAGNETIC HEAD HAVING A MAGNETO-RESISTIVE BRIDGE CIRCUIT

[75] Inventors: Noboru Masuda, Kawaguchi City, Saitama Prefecture; Masahi Kuroyanagi, Kohtoku, Tokyo; Hiroaki Kase, Shinagawaku, Tokyo, all of Japan

[73] Assignee: Denki Onkyo Co., Ltd., Tokyo, Japan

[22] Filed: Apr. 19, 1971

[21] Appl. No.: 135,238

[52] U.S. Cl. ........................179/100.2 CH, 338/32 R

[51] Int. Cl. ..........................G11b 5/30, H01c 7/16

[58] Field of Search ............179/100.2 CH, 100.41 T, 179/100.41 V; 324/46; 340/174 EB; 338/32 R

[56] References Cited

UNITED STATES PATENTS

| | | | |
|---|---|---|---|
| R26,610 | 6/1969 | Koster | 179/100.2 CH |
| 3,061,771 | 10/1962 | Planer | 179/100.41 T |
| 3,341,772 | 9/1967 | Weiss | 324/46 |
| 3,260,980 | 7/1966 | Weiss | 179/100.2 CH |

*Primary Examiner*—Bernard Konick
*Assistant Examiner*—Jay P. Lucas
*Attorney*—James E. Armstrong

[57] ABSTRACT

A magnetic head is provided having at least one loop-shaped magneto-resistance effect device to which two input terminals and two output terminals are alternately connected, four resistor portions being respectively formed between these four terminals. One of these resistor portions is selected as a detector portion and has an external surface arranged to contact a magnetic flux applying means, such as a magnetic tape.

27 Claims, 9 Drawing Figures

INVENTOR.
Noboru Masuda

BY James E. Armstrong

INVENTOR.

BY James E. Armstrong

Patented May 1, 1973 3,731,007

3 Sheets-Sheet 3

INVENTOR.

BY

MAGNETIC HEAD HAVING A MAGNETO-RESISTIVE BRIDGE CIRCUIT

BACKGROUND OF THE INVENTION

The present invention relates to a magnetic head employing at least one magneto-resistance effect device.

Since the conventional magnetic heads employ a 2-terminal type magneto-resistance effect device, the output varies greatly with a change in temperature and therefore it is necessary in addition to provide a temperature compensating device such as, for example, a thermistor.

It is known that the output characteristic inevitably differs with each magnetic head due to variations in the semiconductor material used to make the magnetro-resistance effect devices. Therefore, the conventional magnetic head is disadvantageous because it is difficult to determine the characteristics of the temperature compensating device and in some cases the temperature applied to the magneto-resistance effect devices and temperature compensating devices because these devices are positioned away from each other in the construction of the apparatus.

Furthermore, the conventional magnetic head is disadvantageous because it is difficult to make uniform the output characteristics of a plurality of magnetic heads if the magnetic heads (using the magneto-resistance effect devices) are combined because the output characteristics of the magneto-resistance effect devices are not uniform as mentioned above.

The present invention provides a magnetic head which eliminates the disadvantages mentioned above.

SUMMARY

A magnetic head is provided wherein at least one magneto-resistance effect device is loop-shaped and divided into four resistor portions by four electrodes to which two input terminals and output terminals are alternately connected. The connection is made such that both ends of each resistor portion are respectively connected to one input terminal and one output terminal; three of the four resistor portions are made as the balancing portions and the remaining one resistor portion is formed as the detecting portion so that the magnetic flux of a magnetic flux applying means such as a magnetic recording medium, for example, magnetic tape may be applied to the portion. Thus, the magnetic head is designed so that the voltage across becomes fixed (including zero) when magnetic flux is not applied to the detecting portion by setting the resistance values of the balancing portion and detecting portion to a specified ratio (including 1:1) and so that the voltage across the output terminals varies with variation of resistance of the detecting portion due to the magnetic flux which is applied to the detecting portion.

BRIEF DESCRIPTION OF THE DRAWINGS

These and other features, objects and advantages will become more readily apparent from the following detailed description when taken in conjunction with the drawings which show.

DETAILED DESCRIPTION

Figure 1:
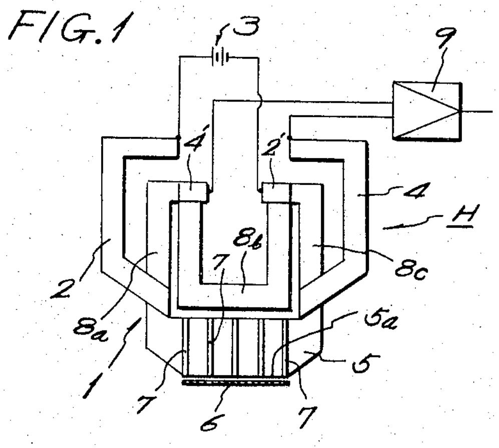
FIG. 1 is a plan view of the magnetic head.
Figure 2:
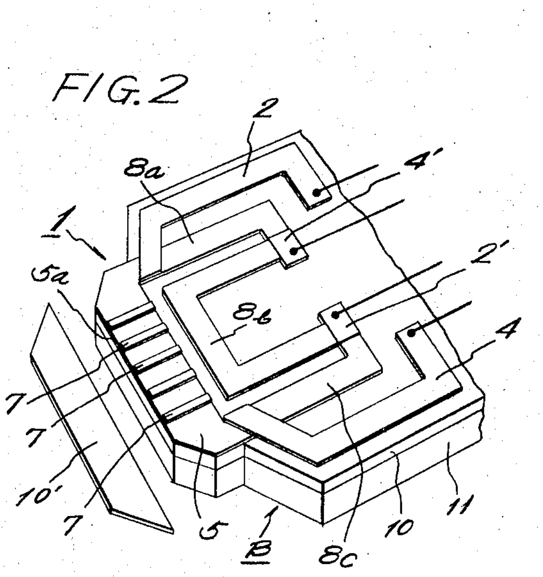
FIG. 2 is an isometric view of the magnetic head.
Figure 3:
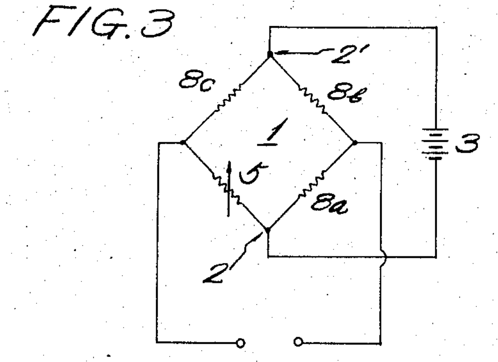
FIG. 3 is a circuit diagram of the magnetic head shown in FIG. 1.

Referring to FIGS. 1 to 3, there is shown a single-unit type magnetic head H.

Magnetic head H is comprised of a loop-shaped magneto-resistance effect device 1 (hereinafter referred to as the "M–R device") made of a semiconductor material such as InAs, InSb, etc., and four electrodes which are formed so that the M-R device is divided into four resistor portions.

Two electrodes, 2 and 2', are used as input terminals to be connected to power supply 3 and the remaining two electrodes, 4 and 4', are used as output terminals.

Input terminals 2 and 2' and output terminals 4 and 4' are alternately arranged whereby one end of each resistor portion of M-R device 1 is connected to an input terminal and the other end to an output terminal.

One of the four resistor portions serves as detecting portion 5 with its periphery 5*a* is formed so as to entirely contact magnetic recording medium 6 such as, for example, a magnetic tape, which passes across periphery 5*a*.

A suitable number of shorting bars 7 are positioned at one surface or at both surfaces of detecting portion 5 in such a way that the shorting bars traverse the corresponding surface. The purpose of these shorting bars is to increase the path of current flow through detecting portion 5 and thus the resistance of detecting portion 5 when detecting portion 5 is subjected to a magnetic field. This result occurs since a magnetic field deflects the current flowing through detecting portion 5 in the vicinity of each electrode or shorting bar. Thus, the greater the number of shorting bars, the greater the variation of resistance of the detecting portion in response to a variation in the magnetic field. These shorting bars are formed by metalizing the surface of detecting portion 5 with a highly conductive material such as, for example, indium. The remaining three resistor portions (except detecting portion 5) are used as balancing portions 8*a*, 8*b* and 8*c*.

The balancing portions are preferably set so that the resistance value across the terminals of each balancing portion is equal to the resistance value of detecting portion 5 when the latter is not subjected to magnetic flux. Accordingly, M-R device 1 forms a bridge circuit which maintains balance when detecting portion 5 does not receive magnetic flux.

Load 9, such as an amplifier, etc., is connected between output terminals 4 and 4'. Thus, this load functions in accordance with the magnitude of the magnetic flux applied to detecting portion 5 due to the application of the output voltage of the bridge circuit to the load.

It is desirable to form R device 1 on substrate B by a photo-etching process. This method is advantageous since compact design and uniform quality may be achieved. Further, it is desirable to use magnetic plate 10, made of magnetic material, as the surface of substrate B on which M-R device 1 is to be mounted as shown in FIG. 2 and to laminate glass plate 11 onto the opposite surface thereof. Thus, the magnetic flux may be concentrated onto the M-R device.

If substrate B, consisting of magnetic plate 10 and glass plate 11, is laminated on both surfaces of M-R device 1, the concentration of the magnetic flux can be improved to a greater extent because the M-R device is sandwiched between two magnetic plates.

Instead of laminating over all portions of M-R device 1, the magnetic plate (*s*) can be laminated onto detecting portion 5 only. In this case, the magnetic head is improved because the sensitivity of detecting portion 5 becomes greater than that of balancing portions 8*a*, 8*b* and 8*c*.

However, when using the photo-etching process to make M-R device 1 as described above, it is difficult to laminate magnetic plate 10, which coincides with the detecting portion, onto both surfaces of detecting portion 5. Therefore, it is, in fact, desirable to laminate magnetic plate 10', which coincides with detecting portion 5, onto the exposed surfaces of the M-R device after M-R device 1 has been formed on substrate B, as shown in FIG. 2. In this case, the gap between upper and lower magnetic plates 10 and 10' can be minimized because M-R device 1 can be extremely thin, thus preventing deterioration of the output level and serving to concentrate magnetic flux onto detecting portion 5.

Shorting bars 7 for shorting both sides of the M-R device are not always required if the magnetic flux can be concentrated onto detecting portion 5 as described above. However, it is desirable to form at least one shorting bar to increase the variance of the resistance value with respect to a variance in the magnetic flux. If desired, the shorting bar may also be provided at the balancing portions.

The present invention is as described above. When magnetic tape 6 does not contact detecting portion 5 and balancing portions 8*a*, 8*b* and 8*c* show the same resistance value, the bridge circuit is balanced. Under these conditions, there is no reproduction by means of load 9 because no voltage exists across output terminals 4 and 4'.

If magnetic flux applying means such as, for example, magnetic tape 6 runs while keeping contact with detecting portion 5, the bridge circuit is unbalanced and voltage occurs across the output terminals since the resistance variation of detecting portion 5 is different from that of balancing portions 8*a*, 8*b* and 8*c*. Since the output voltage is correlated with the density of magnetic flux, the magnetic signal can be reproduced by action of load 9 in keeping with the variation of the output voltage.

The resistance variation of detecting portion 5 is different from that of balancing portions 8*a*, 8*b* and 8*c* for the following reasons.

If M-R device 1 is not provided with both magnetic plate 10 and shorting bar 7, the resistance variation of detecting portion 5 becomes greater than that of the three balancing portions due to difference of the magnetic field intensity caused by the fact that the magnetic tape is away from balancing portions 8*a*, 8*b* and 8*c* while the magnetic tape contacts detecting portion 5. If magnetic plate 10 is attached to detecting portion 5 of M-R device 1, the resistance variation of the detecting portion increases due to the fact that the magnetic flux concentrating onto detecting portion 5 increases.

If at least one shorting bar 7 is provided at detecting portion 5 of the M-R device, the resistance variation increases even though the magnetic flux is nOt concentrated because the sensitivity of the detecting portion to the magnetic field is improved.

As is clearly understood from the foregoing description, the magnetic head of the present invention is such that one side of the bridge circuit is used as detecting portion 5 and the signal is reproduced according to the variation of the output voltage due to the resistance variation of the detecting portion. Therefore, the output voltage need always not be zero when there is no magnetic field and the magnetic head can be designed so that a fixed output voltage occurs when no magnetic flux is applied to detecting portion 5.

Therefore, the resistance values of balancing portions 8*a*, 8*b* and 8*c* can be uneven. In this case, since it is difficult to control the output voltage, it is desirable to design the magnetic head so that the bias magnetic flux is applied to the specified balancing portion or portions.

However, if the magnetic head of the present invention is formed as shown in FIG. 1, it is difficult to apply the bias magnetic flux to a specified balancing portion.

Figure 4:
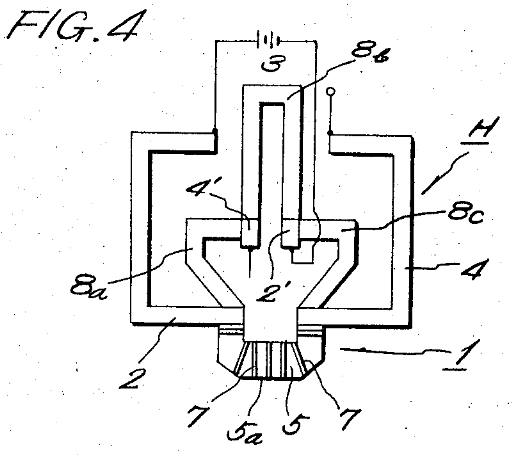
FIGS. 4 to 8 are plan views indicating other embodiments of the magnetic head according to the present invention.
Figure 5:
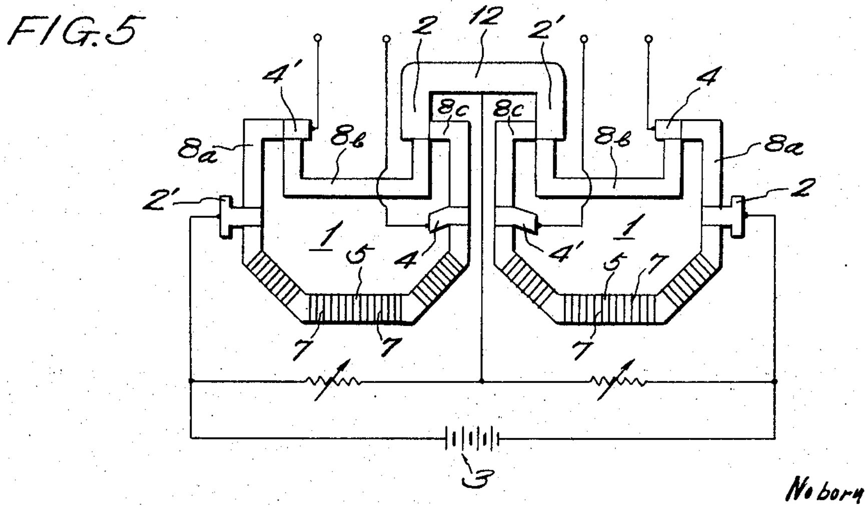
Figure 6:
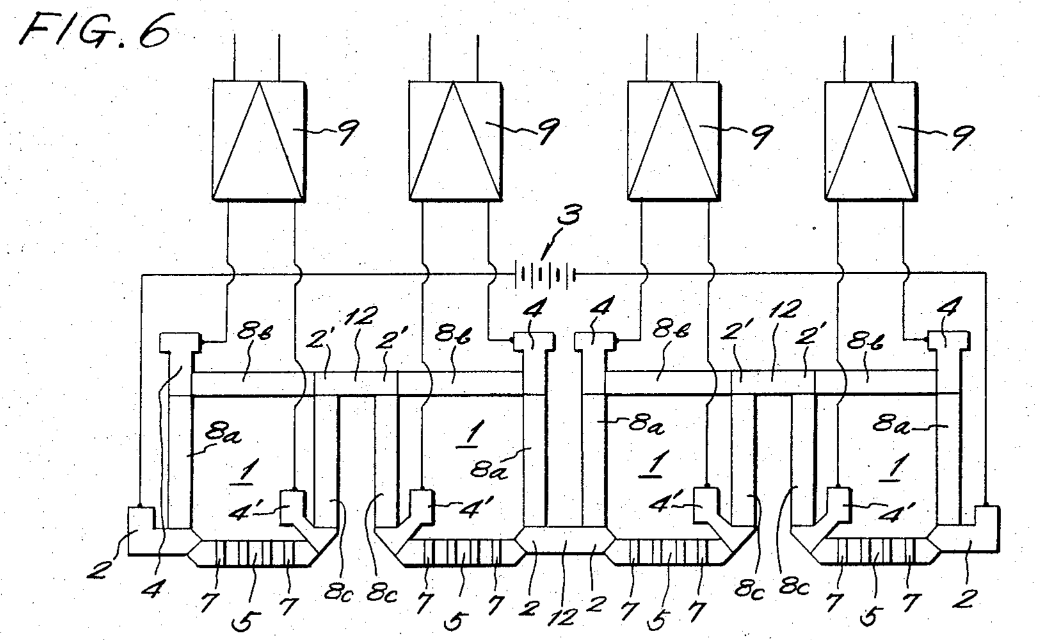
Figure 7:
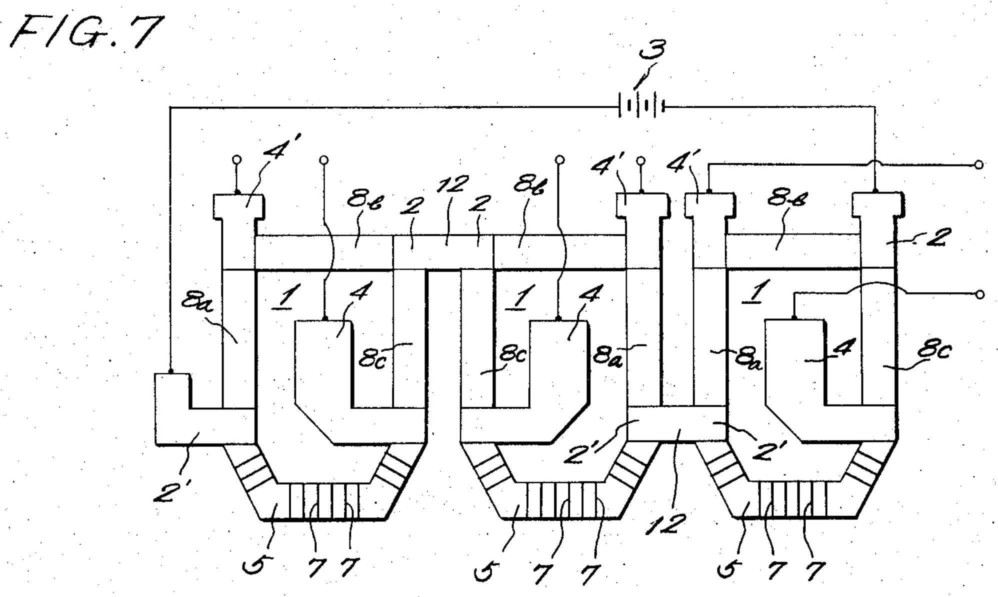

The embodiment of the present invention shown in FIG. 4 eliminates this disadvantage. One of the balancing portions, for example, balancing portion 8*b*, is elongated and its body is extended away from the detecting portion so that the bias magnetic flux can be applied to the extended portion.

In the case of the magnetic head of the present invention, input terminals 2 and 2' may be connected with short circuits 12 in sequence to form a multi-channel head. If a plurality of magnetic heads are continuously connected, the magnetic heads form a hybrid bridge circuit (See FIGS. 5–9).

Figure 8:
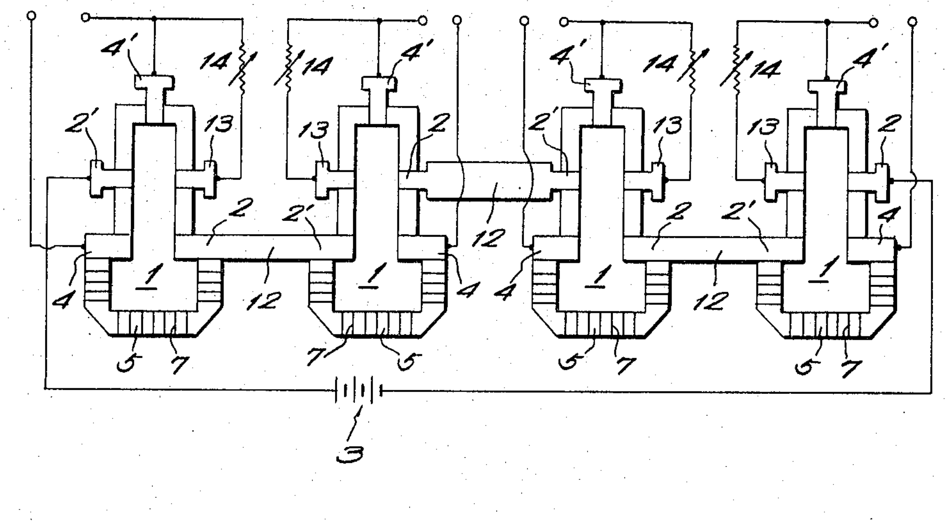
Figure 9:
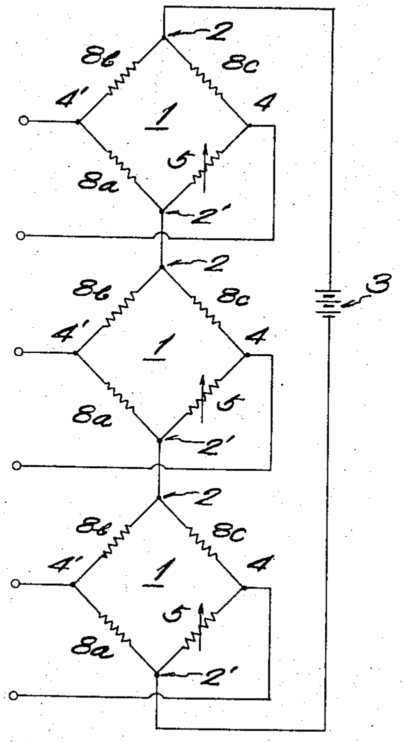
FIG. 9 is a circuit diagram of the magnetic head shown in FIG. 7.

If adjusting resistors are desired in the embodiments described above, intermediate terminal 13 can be formed at at least one of the balancing portions 8*a*, 8*b* and 8*c* as shown, for example, in FIG. 8 and an adjusting resistors, such as variable resistors 14, can be inserted between the corresponding terminal 13 and input terminals 2 and 2' or output terminals 4 and 4'.

Thus, the resistance value of the balancing portions can be adjusted so as to fit the balancing conditions of the bridge circuit.

The following beneficial effect is obtained when the magnetic head of the invention is used. Because the entire loop-shaped M-R devices 1 can be made of the same material, the temperature characteristics of the detecting portion are the same as those of the balancing portions and the setting conditions for the bridge circuit are not disordered even when the temperature rises. Accordingly, the temperature compensating means are unnecessary or at least simplified.

Since the magnetic heads for a plurality of channels may be integrally formed at the same time, they can be mass-produced at low cost and the output voltage characteristic of magnetic heads are equivalent.

While several embodiments of the invention have been shown and described, other variations will be readily apparent to those skilled in the art. Therefore, the invention is not limited to these embodiments but is intended to cover all such variations as may be within the scope of the invention defined by the following claims:

We claim:

1. A magnetic head for sensing a magnetic flux from a magnetic flux applying means comprised of
  a. at least one loop-shaped magneto-resistance effect device, and
  b. two input terminals and two output terminals alternately connected so that said device is divided into four resistor portions, said resistor portions comprising:
    1. a detecting portion positioned for receiving said magnetic flux from said magnetic flux applying means, and
    2. three balancing portions arranged so that the resistances between said terminals assume specied values in reference to the resistance of said detecting portion.

2. A magnetic head according to claim 1, wherein at least one conductive shorting bar traverses at least one surface of said detecting portion to short opposite sides thereof, whereby the variation of the resistances of said detecting portion increases for a given variation in said magnetic flux.

3. A magnetic head according to claim 1, wherein the resistance value across each pair of terminals of said three balancing portions is made equal to the resistance value of said detecting portion when the magnetic flux from said magnetic flux applying means is not applied thereto such that the voltage across the output terminals is zero when said magnetic flux is not applied to said detecting portion.

4. A magnetic head according to claim 1, wherein at least one of three balancing portions is arranged so that the resistance value across its terminals is unequal to the resistance value when the magnetic flux is not applied to the detecting portion and a fixed voltage exists across the output terminals when the magnetic flux is not applied to the detecting portion.

5. A magnetic head according to claim 1, where at least one of the balancing portions is elongated and its body is extended away from the detecting portion.

6. A magnetic head according to claim 5, wherein a bias magnetic flux is applied to the body of the balancing portion extended from the detecting portion.

7. A magnetic head according to claim 1, wherein at least one balancing portion is provided with at least one metallic shorting bar for shorting opposite sides of said balancing portion.

8. A magnetic head according to claim 1, wherein a loop-shaped magneto-resistance effect device is provided on a magnetic plate.

9. A magnetic head according to claim 1, wherein a magneto-resistance effect device is positioned between two magnetic plates.

10. A magnetic head according to claim 9, wherein only the detecting portion is positioned between the upper and lower magnetic plates.

11. A magnetic head according to claim 1, wherein a plurality of loop-shaped magneto-resistance effect devices are integrally associated so that the input terminals can be connected to the devices.

12. A magnetic head according to claim 1, wherein an intermediate terminal is provided at at least one balancing portion and an adjusting resistor is parallel-connected to the balancing portion through the intermediate terminal.

13. A magnetic head according to claim 1, wherein a power supply is connected between the input terminals, and a load is connected between the output terminals and operates in response to the fluctuation of the voltage across the output terminals.

14. A magnetic head for sensing a magnetic flux from a magnetic flux applying means comprising:
  a. a substrate
  b. at least one endless looped-shaped magneto-resistance effect device of semiconductive material disposed on a surface of said substrate
  c. two input and two output terminals alternately contacting said magneto-resistance effect device to divide the latter into four magneto-resistive portions, a first of said portions being a detecting portion arranged along an edge of said substrate and adapted to directly receive said magnetic flux from said magnetic flux applying means, the remaining three portions being balancing portions arranged away from said edge of said substrate and so that the resistances between consecutive terminals assume specified values in reference to the detecting portion.

15. A magnetic head according to claim 14, wherein at least one conductive shorting bar traverses at least one surface of said detecting portion to short opposite sides thereof, whereby the variation of the resistances of said detecting portion increases for a given variation in said magnetic flux.

16. A magnetic head according to claim 15, wherein said substrate comprises an inert base layer and a magnetic plate disposed on top of said base layer, said magneto-resistance device being juxtaposed to said magnetic plate.

17. A magnetic head according to claim 16, wherein said detecting portion is sandwiched between a pair of magnetic plates.

18. A magnetic head according to claim 15, wherein two of said balancing portions extend from opposite sides of said detecting portion in a direction away from said edge of said substrate and the third balancing portion is U-shaped, the open ends facing said detecting portion and extending from said two of said balancing portions.

19. A magnetic head according to claim 15, wherein said magneto-resistance effect device is shaped as a pair of concentric U-shaped portions connected at the open ends thereof.

20. A magnet head according to claim 15, wherein two of said balancing portions extend from opposite sides of said detecting portion in a direction away from said edge of said substrate and the third of said balancing portions being spaced from said detecting portion and disposed between said two of said balancing portions.

21. A magnetic head according to claim 20 comprising at least two of said magneto-resistance effect devices, wherein a first input terminal from a first magneto-resistance effect device is connected by an electrical conductor to a first input terminal of a second magneto-resistance effect device.

22. A magnetic head according to claim 21, wherein the second input terminals of said first and second magneto-resistance effect devices are connected to said electrical conductor by variable resistors.

23. A magnetic head according to claim 21, wherein one end of a detecting portion of a first magneto-resistance effect device is electrically connected to one end of a detecting portion of a second magneto-resistance effect device.

24. A magnetic head according to claim 21 comprising at least three of said magneto-resistance effect devices.

25. A magnetic head according to claim 24 wherein first and second magneto-resistance effect devices are interconnected at a pair of input terminals and said second and a third of said magneto-resistance effect devices are electrically interconnected at another pair of input terminals.

26. A magnetic head according to claim 21,wherein an intermediate part of one of said balancing portions is connected through a variable resistor to the output terminal joining two of said balancing portions.

27. A magnetic head according to claim 26, wherein said intermediate part is positioned between an input terminal and the output terminal to which it is connected by said variable resistor.

* * * * *